United States Patent

Seng et al.

3,991,189
Nov. 9, 1976

[54] MICROBIOCIDAL METHODS AND COMPOSITIONS USING SUBSTITUTED 1,2,4-TRIAZINE-1,4-di-N-OXIDE DERIVATIVES

[75] Inventors: Florin Seng, Schildgen; Kurt Ley, Odenthal-Gloebusch; Brigitte Hamburger, Cologne; Franz Bechlars, Altenberg, all of Germany

[73] Assignee: Bayer Aktiengesellschaft, Germany

[22] Filed: July 28, 1975

[21] Appl. No.: 599,697

Related U.S. Application Data

[62] Division of Ser. No. 409,543, Oct. 25, 1973, abandoned.

[30] Foreign Application Priority Data

Nov. 15, 1972 Germany............................ 2255825

[52] U.S. Cl.................................. 424/249; 71/67; 106/15 R; 260/249.5
[51] Int. Cl.².......................................... A01N 9/22
[58] Field of Search................... 260/249.5; 424/249

[56] References Cited
UNITED STATES PATENTS

| | | | |
|---|---|---|---|
| 2,966,487 | 12/1960 | Jui et al. | 424/249 X |
| 3,108,102 | 10/1963 | Carbon | 260/249.5 |
| 3,226,387 | 12/1965 | Newbold et al. | 260/249.5 X |
| 3,482,024 | 12/1969 | Molnar | 424/249 |
| 3,868,371 | 2/1975 | Ley et al. | 424/249 X |

FOREIGN PATENTS OR APPLICATIONS

| | | |
|---|---|---|
| 405,320 | 8/1970 | Australia |
| 4,538,280 | 12/1970 | Japan |

OTHER PUBLICATIONS

Mason et al., J. Chem. Soc., (B), pp. 911–916, 1970(s).

*Primary Examiner*—James O. Thomas
*Assistant Examiner*—Allen J. Robinson

[57] ABSTRACT

1,2,4-triazine-1,4-di-N-oxides (1,4) useful as microbicides having the formula (I):

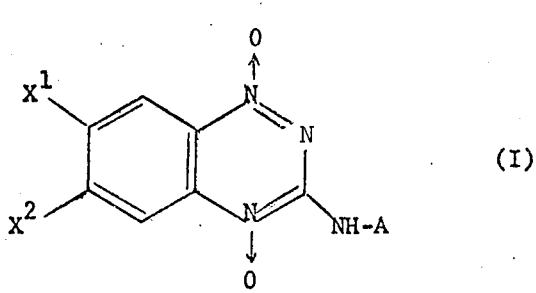

wherein $X^1$ and $X^2$ which may be the same or different are hydrogen, substituted or unsubstituted alkyl, substituted or unsubstituted alkoxy, halogen alkyl or halogen; and A is selected from the group of
 i. R which is unsubstituted or substituted alkyl, substituted or unsubstituted alkenyl, substituted or unsubstituted aralkyl;
 ii. —$COR^1$ in which $R^1$ is hydrogen, substituted or unsubstituted alkyl, substituted or unsubstituted aryl;
 iii. —$COCH_2COCH_3$; and
 iv. —$CONHR^2$ where $R^2$ is substituted or unsubstituted alkyl, substituted or unsubstituted cycloalkyl or substituted unsubstituted aryl.

Processes for making formula (I) compounds are also disclosed.

2 Claims, No Drawings

MICROBIOCIDAL METHODS AND COMPOSITIONS USING SUBSTITUTED 1,2,4-TRIAZINE-1,4-di-N-OXIDE DERIVATIVES

CROSS REFERENCE

This is a division of Ser. No. 409,543 filed Oct. 25, 1973, now abandoned.

BACKGROUND

This invention relates to new derivatives of 3-aminobenzo-1,2,4-triazine-1,4-di-N-oxide to various processes for their preparation and to their use as microbicides.

SUMMARY

It has been found that new 1,2,4-triazine-di-N-oxides corresponding to the formula (I):

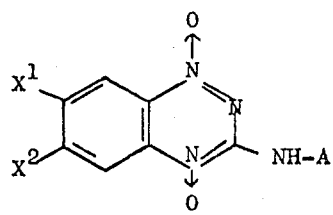

(I)

wherein $X^1$ and $X^2$ which may be the same or different represent hydrogen, substituted or unsubstituted alkyl, substituted or unsubstituted alkoxy, halogen alkyl or halogen; and A represents (a) the radical R which is substituted or unsubstituted alkyl, substituted or unsubstituted alkenyl, substituted or unsubstituted aralkyl;

(b) the group $COR^1$, in which $R^1$ is hydrogen, substituted or unsubstituted alkyl, substituted or unsubstituted aryl;

(c) $-COCH_2COCH_3$; or (d) the group $CONHR^2$, in which $R^2$ is substituted or unsubstituted alkyl, substituted or unsubstituted cycloalkyl or substituted or unsubstituted aryl, show pronounced microbicidal properties.

It has also been found that a 1,2,4-triazine-di-N-oxide corresponding to formula I is obtained when a compound corresponding to the formula (II):

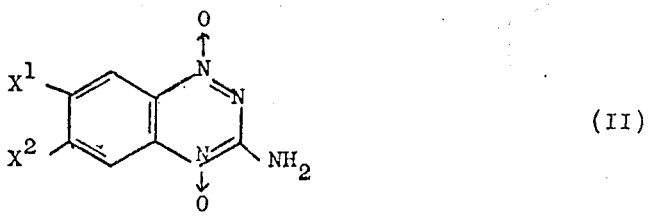

(II)

a. is alkylated with a compound corresponding to the formula III $$R - Y \qquad (III)$$

in which

R is as defined above, and

Y represents the active group of an alkylating agent which is eliminated during the alkylating reaction, optionally in the presence of an acid-binding agent, or b. is acylated with ketene, diketene or a compound corresponding to the formula IV $$R^1 - CO - Z \qquad (IV)$$

in which $R^1$ is as defined above, and

Z represents the active group of an acylating agent which is eliminated during the acylating reaction, optionally in the presence of an acid-binding agent, or c. is reacted with an isocyanate corresponding to the formula $$R^2 - NCO \qquad (V)$$

in which $R^2$ is as defined above, and

The novel 3-aminobenzo-1,2,4-traizine-1,4-di-N-oxides of formula I surprisingly show outstanding microbicidal activity. Accordingly, the substances according to the invention represent an enrichment of the art.

DESCRIPTION

In cases where 3-aminobenzo-1,2,4-triazine-1,4-di-N-oxides and dimethyl sulphate are used as starting materials, the reaction can be reproduced by the following formula scheme (1) [modification a)]:

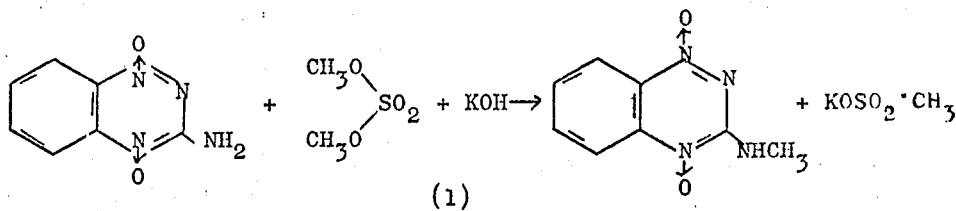

(1)

In cases where 3-aminobenzo-1,2,4-triazine-1,4-di-N-oxide and acetic acid anhydride, benzoyl chloride and diketene are used as starting materials, the reaction can be reproduced by the following formula schemes (2) – (4) [modification b)]:

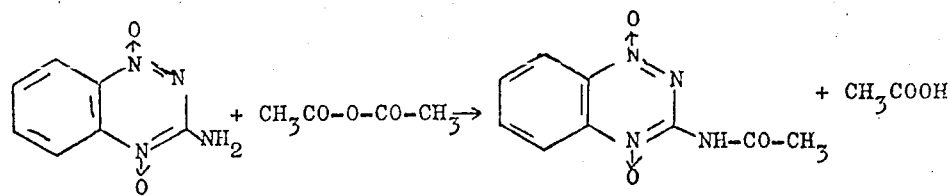

(2)

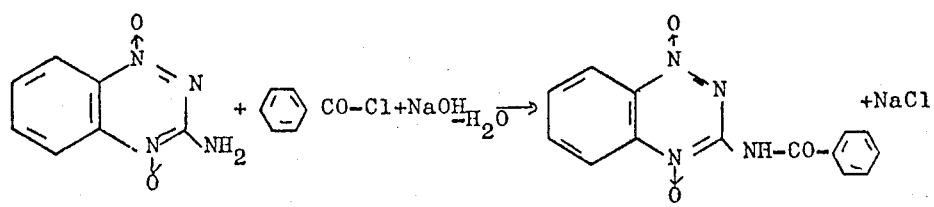

(3)

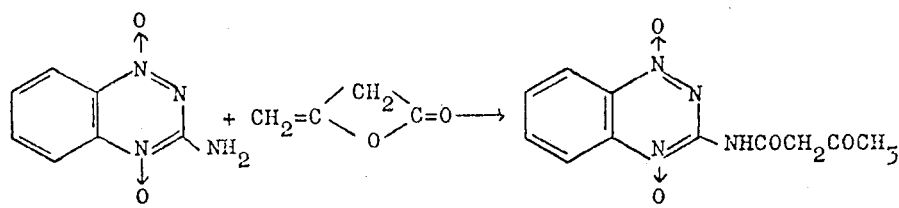

(4)

In cases where 3-aminobenzo-1,2,4-triazine-1,4-di-N-oxide and methyl isocyanate are used as starting materials, the reaction can be reproduced by the following formula scheme (5) [modification c)]:

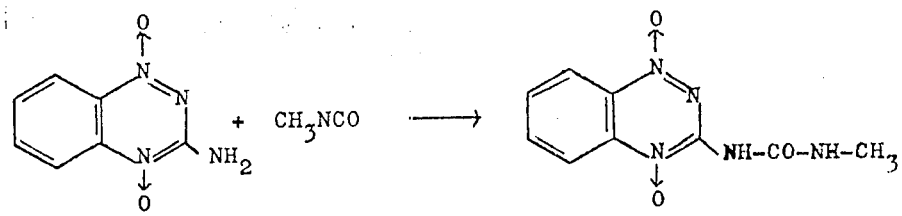

(5)

The starting materials are generally defined by formulae II to V.

The optionally substituted alkyl groups $X^1$, $X^2$, R and $R^2$ are linear or branched alkyls preferably having 1 to 6, more particular 1 to 4 carbon atoms. Optionally substituted methyl, ethyl, n- and i-propyl, n-, i- and t-butyl, are mentioned by way of example.

The optionally substituted alkenyl group R is a linear or branched alkenyl preferably having 2 to 6 and more particularly 2 to 4 carbon atoms. Optionally substituted ethenyl, 1-propenyl, 2-propenyl and 3-butenyl are mentioned by way of example.

The optionally substituted cycloalkyl $R^2$ is a mono-, bi- and tri-cyclic cycloalkyl preferably having 3 to 10 and more particularly 5 or 6 carbon atoms. Optionally substituted cyclopentyl, cyclohexyl, cycloheptyl, bicyclo[2,2,1]heptyl and bicyclo [2,2,2]octyl are mentioned by way of example.

The optionally substituted alkyl group $R^1$ is a linear or branched alkyl group preferably having 1 to 17 and more particularly 1 to 6 carbon atoms. Optionally substituted methyl, ethyl, n- and i-propyl, n-, i and t-butyl, n-octyl, n-decyl and stearyl, are mentioned by way of example.

The optionally substituted alkoxy groups $X^1$ and $X^2$ are linear or branched alkoxy groups preferably having 1 to 6 and more particularly 1 to 4 carbon atoms. Optionally substituted methoxy, ethoxy, n- and i-propoxy and n-, i- and t-butoxy, are mentioned by way of example.

The optionally substituted aryl groups $R^1$ and $R^2$ are aryl groups with 6 or 10, preferably 6, carbon atoms in the aryl portion. Optionally substituted phenyl or naphthyl are mentioned by way of example.

The optionally substituted aralkyl group R is an aralkyl group, optionally substituted in the aryl portion and/or alkyl portion, with preferably 6 or 10 and more particularly with 6 carbon atoms in the aryl portion and with preferably 1 to 4 more particularly 1 or 2 carbon atoms in the alkyl portion which can be linear or branched. Optionally substituted benzyl and phenylethyl are mentioned by way of example.

The optionally substituted alkyl radicals $X^1$, $X^2$, R, $R^1$ and $R^2$, alkenyl radicals R, cycloalkyl radicals $R^2$, alkoxy radicals $X^1$ and $X^2$, aryl radicals $R^1$ and $R^2$ and aralkyl radicals R, can contain one or more, preferably 1 to 3, more particularly 1 or 2, identical or different substituents. The following are mentioned as examples of suitable substituents: alkyl groups with preferably 1 to 4, more particularly 1 or 2 carbon atoms, such as methyl, ethyl, n- and i-propyl and n-, i- and t-butyl; alkoxy groups with preferably 1 to 4, more particularly 1 or 2 carbon atoms, such as methoxy, ethoxy, n- and i-propyloxy and n-, i- and t-butyloxy; halogen alkyl groups with preferably 1 to 4, more particularly 1 or 2 carbon atoms and preferably 1 to 5, more particularly 1 to 3 halogen atoms, the halogen atoms being the same or different and are preferably fluorine, chlorine or bromine, especially fluorine, such as trifluoromethyl; halogen, preferably fluorine, chlorine and bromine, more particularly chlorine and bromine, and nitro.

The halogen alkyl groups $X^1$ and $X^2$ preferably contain from 1 to 4, more particularly 1 or 2 carbon atoms and preferably 1 to 5, more particularly 1 to 3 identical or different halogen atoms, preferably fluorine, chlorine and bromine, more particularly fluorine and chlorine. Trifluoromethyl, chloro-di-fluoromethyl, bromomethyl, 2,2,2-trifluoroethyl and pentafluoroethyl are mentioned by way of example.

Preferred halogens $X^1$ and $X^2$ are fluorine, chlorine and bromine, more particularly fluorine and bromine.

Compounds in which $X^1$ and $X^2$ represent hydrogen, one of the radicals $X^1$ and $X^2$ represents hydrogen and the other methyl or ethyl, methoxy, ethoxy, trifluoromethyl or chlorine, R represents methyl, ethyl, allyl or benzyl, $R^1$ represents methyl, ethyl, stearyl or phenyl, $R^2$ represents methyl, ethyl and cyclohexyl, and A represents —COCH$_2$COCH$_3$, are particularly preferred.

Any of the alkylating agents carrying the radical R of the kind normally used in organic chemistry, can be used as the alkylating agent of formula III. It is preferred to use compounds in which the active group of the alkylating agent Y, which is eliminated during the alkylation, represents halogen, i.e. fluorine, chlorine, bromine and iodine, especially chlorine, bromine and iodine, i.e. alkyl-, alkenyl- or aralkyl halides (the halogen atom in the aralkyl halides being attached to the alkyl component), for example methyl iodide, allyl chloride, benzyl bromide, or in which Y represents the group —O—SO$_2$—OR$^3$, in which $R^3$ can have the same range of meanings as R and in which $R^3$ preferably represents alkyl (as defined in the case of R), i.e. in particular dialkylsulphates, for example dimethylsulphate and diethylsulphate, or in which Y represents —O—SO$_2$—R$^4$ where $R^4$ represents an optionally substituted aryl radical, preferably phenyl or 4-methylphenyl, i.e. aryl sulphonic acid esters, for example phenyl sulphonic acid methyl ester and 4-methylphenyl sulphonic acid methyl ester.

Any of the acylating agents carrying the radical $R^1$—CO of the kind normally used in organic chemistry, can be used as the acylating agent of formula IV. It is preferred to use compounds in which the active group of the acylating agent Z, which is eliminated during the acylating reaction, represents halogen such as fluorine, chlorine and bromine, especially fluorine and chlorine, i.e. acid halides, for example acetyl chloride, or in which Z represents the group —O—CO—R$^5$ where $R^5$ can have the same meaning as $R^1$, i.e. carboxylic acid anhydrides, for example acetic acid anhydride.

The compounds of formula II are known or can be obtained by known methods (c.f. J. C. Mason and G. Tennant, J. Chem. Soc. London, B 1970, 711).

They can also be prepared in accordance with one of our own proposals in which a benzofuroxane corresponding to the formula (VI):

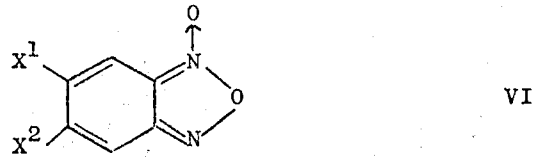

VI in which $X^1$ and $X^2$ are as just defined, is reacted with twice the molar quantity of disodium cyanamide in aqueous methanol at a temperature of about 20° to 60° C, the compound of formula II which precipitates in crude form is filtered off, the deposit dissolved in water and the aqueous solution acidified with acetic acid. The compounds of formula II are precipitated in crystalline form.

The following are mentioned as specific examples of formula II compounds:
3-aminobenzo-1,2,4-triazine-1,4-di-N-oxide
6-methyl-3-aminobenzo-1,2,4-triazine-1,4-di-N-oxide
7-ethyl-3-aminobenzo-1,2,4-triazine-1,4-di-N-oxide
6-methoxy-3-aminobenzo-1,2,4-triazine-1,4-di-N-oxide
6-ethoxy-3-aminobenzo-1,2,4-triazine-1,4-di-N-oxide
6 trifluoromethyl-3-aminobenzo-1,2,4-triazine-1,4-di-N-oxide
7-chloro-3-aminobenzo-1,2,4-triazine-1,4-di-N-oxide
6,7-dimethyl-3-aminobenzo-1,2,4-triazine-1,4-di-N-oxide
6,7-dichloro-3-aminobenzo-1,2,4-triazine-1,4-di-N-oxide
6,7-dimethoxy-3-aminobenzo-1,2,4-triazine-1,4-di-N-oxide
6,7-diethoxy-3-aminobenzo-1,2,4-triazine-1,4-di-N-oxide The compounds of formula III are known or can be obtained by standard methods. The following are mentioned by way of example: methyl iodide, ethyl bromide, benzyl chloride, i-propyl chloride, n-propyl iodide, dimethylsulphate, diethylsulphate, di-n-propylsulphate, phenylsulphonic acid methyl ester, 4-phenylsulphonic acid ethyl ester.

The compounds of formula IV are known or can be obtained by standard methods. The following are mentioned by way of example: acetyl chloride, propionyl bromide, propionyl chloride, butyric acid chloride, valeric acid chloride, hexanoic acid chloride, cyclohexanoic acid chloride, acetic acid anhydride and n-propionic acid anhydride.

The isocyanates of formula V are known or can be obtained by standard methods. The following are mentioned as examples: methyl isocyanate, ethyl isocyanate, n-propyl isocyanate and i-propyl isocyanate.

Any inert organic solvents can be used as diluents. Preferred diluents include ethers, for example diethyl ether, dioxane and tetrahydrofuran, lower alkyl ketones, for example acetone and methylethyl ketone, lower dialkyl formamides, for example dimethyl formamide, aliphatic or aromatic hydrocarbons optionally substituted by halogen, lower alkyl or nitro, for example methylene chloride, chloroform, carbon tetrachloride, nitromethane, hexane, heptane, benzene, toluene, xylenes, chlorobenzene, dichlorobenzene and nitrobenzene, lower alkyl nitriles, for example acetonitrile, and heteroaromatic compounds, for example pyridine. It is also possible to use mixtures of these solvents with one another and, in cases where the starting compounds used are inert with respect to water, water can also be additionally used. In many cases, it is also possible to use a reactant present in excess (for example carboxylic acid anhydride) as solvent.

Any of the usual acid-binding agents can be used as the acid binder. Preferred acid binders include alkali and alkaline earth hydroxides, alkaline earth oxides, alkali and alkaline earth carbonates and bicarbonates, also tertiary aliphatic and aromatic amines and heterocyclic bases. The following are mentioned by way of example: sodium, potassium and calcium hydroxide, calcium oxide, sodium and potassium carbonate, sodium and potassium bicarbonate, triethylamine, diazabicyclononene and diazabicycloundecene.

The reaction temperatures can be varied within a relatively wide range. In general, the reaction is carried out at a temperature of about 0° to 150° C and most preferably at temperatures of about 20° to 100° C. However, the reaction can also be carried out at temperatures above or below this range.

The reaction can be carried out under normal pressure and even under elevated pressure. In general, it is carried out under normal pressure.

To carry out the process according to the invention, it is best to use per 1 mol of the compound of formula II, from 1 to 5 mols, preferably 1 to 2 mols, of each of the reaction components of formulae III, IV or V and, in addition, from 1 to 10 mols and preferably from 1 to 2 mols of an acid binder in cases where an acid is liberated. It is possible to derivate considerably from the aforementioned molar ratios without adversely affecting the result of the reaction to any real extent.

To carry out the process according to the invention, the compound of formula II is dissolved or suspended in a diluent and the second reaction component of formulae III, IV or V and, optionally, the acid binder is added in portions to the resulting solution or suspension. The reaction components can be combined in any order. In most cases, the end products of formula I are precipitated after a short time in crystalline form, optionally following concentration of the diluent by evaporation. They can be isolated and purified by conventional methods, for example by recrystallization.

The following are specifically mentioned as examples of the new active substances:

3-N-methylaminobenzo-1,2,4-triazine-1,4-di-N-oxide
3-N-ethylaminobenzo-1,2,4-triazine-1,4-di-N-oxide
3-N-n-propylaminobenzo-1,2,4-triazine-1,4-di-N-oxide
3-N-i-propylaminobenzo-1,2,4-triazine-1,4-di-N-oxide
3-N-acetylaminobenzo-1,2,4-triazine-1,4-di-N-oxide
3-N-n-propionylaminobenzo-1,2,4-triazine-1,4-di-N-oxide
3-N-i-propionylaminobenzo-1,2,4-triazine-1,4-di-N-oxide
3-N-benzoylaminobenzo-1,2,4-triazine-1,4-di-N-oxide
3N-stearylaminobenzo-1,2,4-triazine-1,4di-N--oxide
3N-allylaminobenzo-1,2,4-triazine-1,4-N-oxide
6-methyl-3-N-methylaminobenzo-1,2,4-triazine-1,4,di-N-oxide
7-methoxy-3-N-methylaminobenzo-1,2,4-triazine-1,4-di-N-oxide
6,7-diethoxy-3-N-methylaminobenzo-1,2,4-triazine-1,4-di-N-oxide
6,7-dichloro-3-N-ethylaminobenzo-1,2,4-triazine-1,4-di-N-oxide
6,7-dimethoxy-3-N-ethylaminobenzo-1,2,4-triazine-1,4-di-N-oxide
7-trifluoromethyl-3-N-i-propylaminobenzo-1,2,4-triazine-1,3,-di-N-oxide
1'-methyl-3'-[3-beno-1,2,4-triazinyl-1,4,-di-N-oxide]urea
1'-cyclohexyl-3'-[3-benzo-1,2,4-triazinyl-1,4-di-N-oxide]urea
1'-ethyl-3'-[3-benzo-1,2,4-triazinyl-1,4-di-N-oxide]urea The active substances of formula I show pronounced anti-microbial activity. Their activity covers for example gram-positive and gram-negative bacteria, the following families, geni and species of bacteria being mentioned by way of example: Enterobacteriaceae, for example Eschericha, especially *Escherichia coli;* Klebsiella, especially *Klebsiella pneumoniae,* Enterobacter; Proteus, especially *Proteus vulgaris, Proteus mirabilis, Proteus morganii, Proteus rettgeri* and Salmonella, especially *Salmonella typhi murium* and *Salmonella enteritidis;* from the family of Pseudomonadaceae, for example *Pseudomonas aeruginosa,* Aeromonas, for example *Aeromonas liquefaciens;* Clostridien, for example *Clostridium botulinum, Clostridium tetani;* from the family of Micrococcaceae, for example *Staphylococcus aureus* and *Staphylococcus epidermidis;* from the family of Streptococcaceae, for example *Streptococcus pyogenes* and *Streptococcus faecalis* (Enterococcus); from the family of Mycoplasmataceae, for example *Mycoplasma pneumoniae* and *Mycoplasma arthritidis.*

The outstanding, wide microbicidal activity of the compounds of formula I enables them to be widely used as microbicides, for example for the preservation of paints and dispersion dyes, for disinfecting water, and, in particular, also as algicides, and for the antimicrobial finishing of textile materials.

The pronounced microbicidal activity of the compounds of formula I is demonstrated by the following Examples:

EXAMPLE A: MICROBICIDAL ACTIVITY/RECIPROCAL GERM-INHIBITING VALUES

The powerful microbicidal action of compounds of formula I is demonstrated in the following with reference to a few selected species from the three groups bacteria, yeasts and fungi in comparison with a conventional disinfectant, pentachlorophenol, in the germ-inhibiting test carried out as follows by the standard dilution method:

The micro organisms used for the inhibition test are widespread and known to be resistant to conventional chemical preservatives and disinfectants.

The reciprocal germ-inhibition values, i.e. the dilutions of the preparations with diluent and nutrient substrate, at which there is still no sign of germ growth, are quoted in Table A below for the preparations tested and the micro organisms used.

Table A

| Active substance | Microbicidal action / Reciprocal germ-inhibition values | | | | | | | | | |
|---|---|---|---|---|---|---|---|---|---|---|
| | Aspergillus terreus | Penicillium camerunense | Paecilomyces varioti | Trichophyton mentagrophytes | Candida albicans | Saccharomyces spec. | Bact. proteus | Staphylococcus aureus | Pseudomonas pypcyanea | Escherichia coli |
| Sodium pentachlorophenate (known) | 17000 | | | | 17 000 | | 4000 | | 3000 | 3000 |
| 3-acetamido-quinoxaline-1,4-dioxide | 7000 | 30 000 | 30 000 | 14 000 | 30 000 | 30 000 | 30 000 | 7000 | 7000 | 30 000 |
| 3-methylamino-benzo-1,2,4-triazine-1,4-dioxide | 5400 | 23 000 | 12 000 | 12 000 | 23 000 | 23 000 | 12 000 | 5400 | 5400 | 23 000 |
| 3-propionamido-benzo-1,2,4-triazine-1,4-dioxide | 5600 | 22 000 | 12 000 | 22 000 | 22 000 | 22 000 | 22 000 | 22 000 | 12 000 | 22 000 |

EXAMPLE B: MICROBICIDAL ACTION/RECIPROCAL GERM-INHIBITION VALUES

Preservation of paints and dispersion dyes.

The active substances were added directly to the paint and dispersion dye; and evaluation was carried out by spreading the paint over nutrient media after 1, 7 and 14 days, followed by incubation. In Table B below, the active substance added is identified in column 1, the concentration of the active substance in the paint or dispersion dye in grams per liter in column 2 and the assessment of the paint or dye spread out after 1, 7 and 14 days following incubation, in column 3, + indicating decay and — indicating no decay of the paint or dye under the effect of micro organisms.

Table B

| Active substance | Microbicidal action / Preservation of paints | | | |
|---|---|---|---|---|
| | concentration in paint or dispersion dye (g/l) | decay under the effect of micro organisms after | | |
| | | 1 day | 7 days | 14 days |
| Control (untreated) | | + | + | + |
| Sodium pentachlorophenolate (known) | 5<br>2<br>1 | +<br>+<br>+ | +<br>+<br>+ | +<br>+<br>++ |
| 3-acetamido-isoquinoline-1,4-di-N-oxide | 5<br>2<br>1 | +<br>+<br>+ | −<br>−<br>+ | −<br>−<br>− |

As can be seen from this Table, both the untreated control and also the paint or dye treated by the addition of pentachlorophenolate were decayed by microorganisms in each test, whilst the paint or dye treated with a compound of formula I contained microorganisms which, although capable of multiplication on the first day, had all been destroyed after 14 days.

EXAMPLE C: ALGICIDAL ACTION/DISINFECTION OF CIRCULATED WATER 25 cc of a solution of 50 g of the active substances identified in Table C below and 50 g of ethyl glycol were added three times daily to circulated water from a cooling tower and an air-conditioning installation heavily contaminated by algae (per m³ of water). The reduction in the number of germs is shown in Table C below

Table C

| Algicidal action / disinfection of circulated water | | Number of germs/cc |
|---|---|---|
| Active substance | Before addition | 500,000 |
| Alkyldimethylbenzyl ammonium chloride (known commercial product) | 15 minutes after addition | 2,000 |
| 3-acetamido-isoquinoline-1,4-di-N-oxide | 15 minutes after addition<br>30 minutes after addition<br>60 minutes after addition<br>120 minutes after addition | 20<br>20<br>20<br>10 |
| 3-methylamino-isoquinoline-1,4-di-N-oxide | 15 minutes after addition<br>30 minutes after addition<br>60 minutes after addition<br>120 minutes after addition | 50<br>—<br>600<br>2000 |

Table C-continued

| Algicidal action / disinfection of circulated water | | |
|---|---|---|
| Active substance | Before addition | Number of germs/cc 500,000 |
| [structure: benzo-1,2,4-triazine-1,4-di-N-oxide with NH—CO—C$_2$H$_5$] | 15 minutes after addition<br>30 minutes after addition<br>60 minutes after addition<br>120 minutes after addition | 50<br>60<br>60<br>60 |

EXAMPLE D: MICROBICIDAL ACTION/ANTIMICROBIAL FINISHING OF WOVEN FABRIC

Fabric woven from wool was treated for 30 minutes at 50° C in an aqueous bath with a solution ratio of 1 : 15 to which 0.1 to 1% of a compound of general formula I (based on the weight of the fabric) had been added, and the fabric was then dried.

Textile material treated with active substance in the same way as described above cut into 2.2 cm pieces which were placed on nutrient substrate inoculated with *staphylococcus aureus* and *trichophyton mentagrophytis*.

After incubation for 24 and 72 hours at 30° C, the inhibition zones were measured. The inhibition zones in millimeters are quoted in Table D below for untreated controls and for woven fabric treated as described above with quantities of 3-N-acetylaminobenzo-1,2,4-triazine-di-N-oxide (1,4) varying within the range of from 0.1 to 1.0% by weight, based on the weight of the fabric.

17.8 g (0.1 mol) of 3-aminobenzo-1,2,4-triazine-1,4-di-N-oxide and 15.1 g (0.12 mol) of dimethyl sulphate were suspended or dissolved in 60 ml of dimethyl formamide. This was followed by the dropwise addition of a solution of 5.6 g (0.1 mol) of potassium hydroxide in 5 ml of water. An exothermic reaction took place, the 3-aminobenzo-1,2,4-triazine-di-N-oxide (1,4) dissolving with a blue colour. After a while, the colour changed to brown and orange-coloured crystals were precipitated from the solution. 15 g (78% of the theoretical) of 3-N-methylaminobenzo-1,2,4-triazine-1,4-di-N-oxide were obtained in the form of orange-coloured crystals which melted with decomposition at 210° C following dissolution in and reprecipitation from dimethyl formamide/acetonitrile.

Table D

| Microbicidal action / antimicrobial finishing | | | |
|---|---|---|---|
| | | Inhibition zones in mm | |
| Active substance | % | staph. aureus | tricho. ment. |
| Control (untreated) | | 0 | 0 |
| [structure: benzo-1,2,4-triazine-1,4-di-N-oxide with NH—CO—CH$_3$] | 0.1<br>0.25<br>0.5<br>0.75<br>1.0 | 3<br>6<br>9<br>10<br>10 | 0<br>3<br>5<br>5<br>7 |

The preparation of the compounds according to the invention corresponding to formula I is illustrated by the following Examples:

EXAMPLE 1

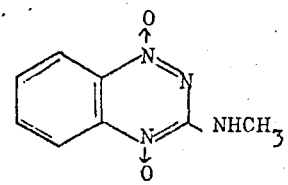

EXAMPLE 2

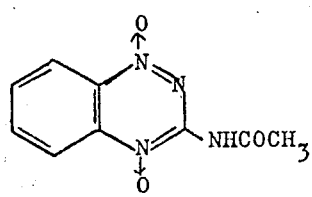

17.8 g (0.1 mol) of 3-aminobenzo-1,2,4-triazine-1,4-di-N-oxide were suspended in 100 ml of acetone, and 10.2 g (0.1 mol) of acetic acid anhydride were added dropwise to the resulting suspension. After 4 hours, the product was filtered off under suction, giving 21 g (96% of the theoretical yield) of 3-N-acetylaminobenzo-1,2,4-triazine-1,4-di-N-oxide in the form of yellow crystals which melted with decomposition at 200° C after dissolution in and reprecipitation from acetonitrile.

EXAMPLE 3

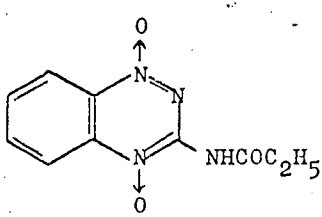

3-N-proionylaminobenzo-1,2,4-triazine-1,4-di-N-oxide decomposing at 168° C was obtained as in Example 2 from 3-aminobenzo-1,2,4-triazine-1,4-di-N-oxide and propionic acid anhydride.

EXAMPLE 4

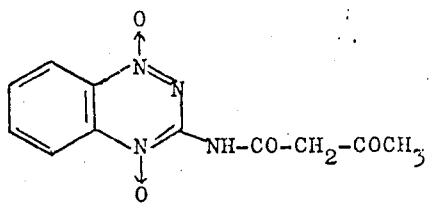

The above compound which decomposed at 169° C was obtained as in Example 2 from 3-aminobenzo-1,2,4-triazine-1,4-di-N-oxide and diketene.

EXAMPLE 5

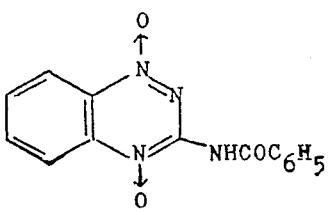

17.8 g (0.1 mol) of 3-aminobenzo-1,2,4-triazine-1,4di-N-oxide were dissolved in a mixture of 80 ml of water and 4 g (0.1 mol) of sodium hydroxide. 10.5 g (0.1 mol) of benzoyl chloride were added dropwise to the resulting blue-coloured solution. A weakly exothermic reaction began and a brown deposit was precipitated. It was filtered off under suction, giving 25 g (89% of the theoretical yield) of 3-N-benzoylaminobenzo-1,2,4-triazine-1,4-di-N-oxide in the form of yellowish-brown crystals which melted with decomposition at 178° C after dissolution in and reprecipitation from dimethyl formamide/acetonitrile.

EXAMPLE 6

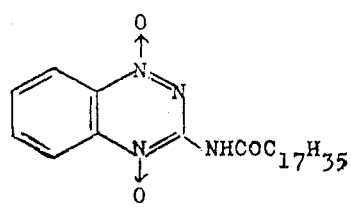

3-N-stearylaminobenzo-1,2,4-triazine-1,4-di-N-oxide decomposing at 148° C was obtained as in Example 5 from 3-aminobenzo-1,2,4-triazine-1,4-di-N-oxide and stearic acid chloride.

EXAMPLE 7

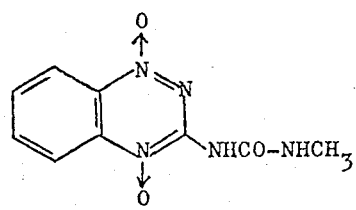

17.8 g (0.1 mol) of 3-aminobenzo-1,2,4-triazine-1,4-di-N-oxide were suspended in 100 ml of dimethyl formamide and the resulting suspension was stirred for 2 hours at about 55° C with 5.7 g (0.1 mol) of methyl isocyanate and 2 ml of pyridine. After cooling and filtration under suction, 15 g (66% of the theoretical yield) of 1'-methyl-3'-[3-benzo-1,2,4-triazinyl-1,4-di-N-oxide] urea were obtained in the form of yellow crystals which melted with decomposition at 198° C.

EXAMPLE 8

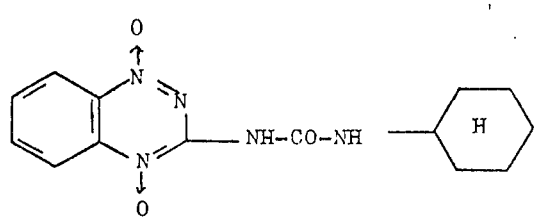

1'-Cyclohexyl-3'-[3-benzo-1,2,4-triazinyl-1,4-di-N-oxide] urea decomposing at 203° – 206° C was obtained as described in Example 7 from 3-aminobenzo-1,2,4-triazine-1,4-di-N-oxide and cyclohexyl isocyanate.

EXAMPLE 9

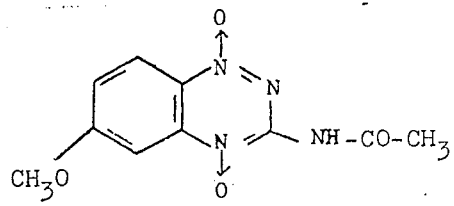

3-N-acetylamino-6-methoxy-benzo-1,2,4-triazine-1,4-di-N-oxide decomposing at 224° C was obtained as in Example 2 from 3-amino-6-methoxybenzo-1,2,4-triazine-1,4-di-N-oxide and acetic acid anhydride.

The preparation of the starting compounds of formula II is illustrated by the following Example:

EXAMPLE a:

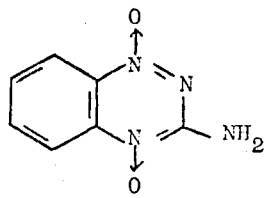

13.6 g (0.1 mol) of benzofuroxane were suspended at room temperature (approximately 20° C) in a mixture of 40 ml of methanol and 40 ml of $H_2O$, followed by the addition in portions of 17.2 g (0.2 mol) of disodium cyanamide. The temperature rose to between about 50° and 60° C and the solution turned bluish-violet in colour. It was then stirred for 40 minutes at around 60° C, after which the deposit precipitated was filtered off under suction from the mother liquor. The deposit was dissolved in water, filtered and the filtrate acidified with acetic acid. 12.5 g (71% of the theoretical yield) of 3-amino-1,2,4-benzotriazine-1,4-di-N-oxide were precipitated in the form of reddish-gold crystals which melted with decomposition at 220° C.

The remaining formula II used as starting compounds according to the invention can be similarly obtained.

What is claimed is:

1. A method of combatting the growth of bacteria, yeast or fungi which comprises applying to an environment an effective amount of a compound of the formula:

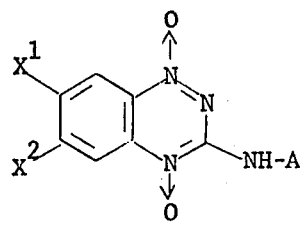

wherein
  $X^1$ and $X^2$ are the same or different and each is hydrogen; halogeno; alkyl of 1 to 6 carbon atoms; haloalkyl of 1 to 4 carbon atoms and up to 5 halogen atoms; or alkoxy of 1 to 6 carbon atoms; and
  A is (i) alkyl of 1 to 6 carbon atoms; alkenyl of 2 to 6 carbon atoms; phenylethyl; or benzyl; (ii) an acyl group of the formula —$COR^1$ wherein $R^1$ is hydrogen; alkyl of 1 to 17 carbon atoms; naphthyl or phenyl; (iii) acetoacetyl; or (iv) a carbamyl group of the formula —$CONHR^2$ wherein $R^2$ is alkyl of 1 to 6 carbon atoms; cycloalkyl of 3 to 10 carbon atoms; naphthyl; or phenyl.

2. The method according to claim 1 wherein in said compound $X^1$ and $X^2$ are the same or different and each is hydrogen, chloro, methyl, ethyl, methoxy, ethoxy or trifluoromethyl; and A is methyl, ethyl, allyl, benzyl, acetyl, propionyl, stearoyl, benzoyl, acetoacetyl, methylcarbamyl, ethylcarbamyl or cyclohexylcarbamyl.

* * * * *